United States Patent [19]

Marlett

[11] Patent Number: 5,045,300

[45] Date of Patent: Sep. 3, 1991

[54] PREPARATION OF COMPLEX ALUMINUM FLUORIDES

[75] Inventor: Everett M. Marlett, Baton Rouge, La.

[73] Assignee: Ethyl Corporation, Richmond, Va.

[21] Appl. No.: 601,517

[22] Filed: Oct. 23, 1990

[51] Int. Cl.$^5$ ............................................. C01F 7/54
[52] U.S. Cl. ..................................... 423/465; 423/489
[58] Field of Search ............... 423/463, 464, 465, 489; 556/176, 186; 564/291

[56] References Cited

U.S. PATENT DOCUMENTS

| | | | |
|---|---|---|---|
| 2,857,252 | 10/1958 | Schmidt | 423/465 |
| 3,635,659 | 1/1972 | Kidde | 423/465 |
| 4,100,183 | 7/1978 | Christenson et al. | 423/463 |
| 4,251,501 | 2/1981 | Kobayashi et al. | 423/465 |
| 4,900,856 | 2/1990 | Marlett | 556/176 |
| 4,957,726 | 9/1990 | Marlett et al. | 556/176 |

FOREIGN PATENT DOCUMENTS

| | | | |
|---|---|---|---|
| 74023117 | 6/1968 | Japan | 423/465 |
| 74024356 | 7/1969 | Japan | 423/465 |
| 823291 | 4/1981 | U.S.S.R. | 423/465 |

*Primary Examiner*—Michael L. Lewis
*Assistant Examiner*—Brian M. Bolam
*Attorney, Agent, or Firm*—T. B. Morris

[57] ABSTRACT

A process comprising the reaction of an amine.aluminum trichloride complex and a bifluoride compound to produce an aluminum fluoride compound. Exemplary processes include the reaction of $AlCl_3.N(CH_2CH_3)$ and $NH_4HF_2$ or $NaHF_2$ to respectively produce $NH_4AlF_4$ or $Na_5Al_3F_{14}$.

11 Claims, No Drawings

PREPARATION OF COMPLEX ALUMINUM FLUORIDES

BACKGROUND

Industrial processes exist which produce an amine complex with aluminum trichloride ($AlCl_3$). Examples of such processes include the reaction of silicon tetrachloride and an amine alane to produce silane and an amine-aluminum trichloride complex, according to the following equation:

$$3SiCl_4 + 4AlH_3 \cdot NR_3 \rightarrow 3SiH_4 + 4AlCl_3 \cdot NR_3$$

For instance, see U.S. Pat. Nos. 4,006,095 and 4,900,856.

Although silane ($SiH_4$) is a useful product, the by-product $AlCl_3 \cdot Nr_3$ complex does not have much value. One use would exist if aluminum trichloride could be recovered from this complex; however, this complex does not readily dissociate by heating to permit recovery of aluminum trichloride. Therefore it is desirable to find useful reactions of these amine-aluminum trichloride complexes to convert them to useful byproducts.

SUMMARY OF THE INVENTION

The present invention is a process for the reaction of an amine-aluminum trichloride complex with a bifluoride compound to produce an aluminum fluoride compound. The preferred complex reactant is $AlCl_3 \cdot N(CH_2CH_3)_3$.

DESCRIPTION OF THE PREFERRED EMBODIMENTS

One embodiment of the present invention is a process comprising the reaction of an amine-aluminum trichloride complex and a bifluoride compound to produce an aluminum fluoride compound.

In the above embodiment, the amine-aluminum trichloride complex can be represented by the formula $AlCl_3NR_3$ "R" represents either hydrogen or an alkyl group. When R is an alkyl group, R is preferably an alkyl group containing from one carbon atom to about ten carbon atoms, more preferably from one carbon atom to about four carbon atoms. Although R can be either saturated or unsaturated, preferably R is a saturated alkyl group. Although R can be either a straight chain or a branched alkyl group, preferably R is a straight chain alkyl group.

Accordingly, R preferably is either hydrogen or an alkyl group selected from a group consisting of methyl, ethyl, propyl and butyl. More preferably, the propyl group is n-propyl and the butyl group is n-butyl. Each of the three R groups of the amine aluminum trichloride complex $AlCl_3 \cdot NR_3$ can be the same R group or a different R group such that each R group is independently selected from the above groups.

For example, the $NR_3$ portion of the $AlCl_3 \cdot NR_3$ complex can be $NH_2R$, $NHR_2$ or $NR_3$ where R is an alkyl group as above. Specific examples include, but are not exclusive examples, the following: $NH_2CH_3$, $NH(CH_3)_2$, $N(CH_3)_3$, $NH_2CH_2CH_3$, $NH(CH_2CH_3)_2$, $N(CH_2CH_3)_3$, $NH(CH_3)(CH_2CH_3)$, $N(CH_2CH_3)_3$, $N(CH_2CH_2CH_3)_3$ etc. A preferred amine-aluminum trichloride complex is $AlCl_3 \cdot N(CH_2CH_3)_3$, i.e. $AlCl_3 \cdot N(Et)_3$, wherein "Et" represents ethyl.

The bifluoride compound is a bifluoride compound reactive with the selected amine-aluminum trichloride complex to produce an aluminum fluoride compound. Preferably the bifluoride compound is ammonium bifluoride (e.g. $NH_4HF_2$) or a metal bifluoride compound, e.g. potassium bifluoride ($KHF_2$); or sodium bifluoride ($NaHF_2$). Most preferred bifluoride compounds are ammonium bifluoride and sodium bifluoride.

The reaction of the amine-aluminum trichloride complex and the bifluoride compound is preferably performed in an aromatic or hydrocarbon solvent, more preferably in toluene. The solvent can be used primarily for an initial mixing of the reactants and then either maintained during reaction or distilled away before completion of reaction, depending in part upon the bifluoride compound reactant used.

For instance, an embodiment of the invention can be the admixing of an aluminum trichloride-triethylamine complex, e.g. $AlCl_3 \cdot N(Et)_3$, and sodium bifluoride, e.g. $NaHF_2$, in toluene at room temperature. The toluene is then distilled from the admixture. After distillation of toluene, the remaining admixture is heated to higher temperatures until reaction is indicated, such as by the liberation of hydrogen chloride gas. Reaction is maintained until formation of solid product.

This reaction can be stoichiometrically represented by the following equation:

$$3AlCl_3 \cdot Nr_3 + 7NaHF_2 \rightarrow Na_5Al_3F_{14} + 3R_3N \cdot HCl + 2NaCl + 4HCl$$

In another instance, an aluminum trichloride-triethylamine complex and ammonium bifluoride, e.g. $NH_4HF_2$, is admixed with toluene solvent to form a reaction mass comprising a solid product. Subsequently, the toluene can be distilled from the reaction mass.

The above reaction can be stoichiometrically represented by the following equation:

$$AlCl_3 \cdot Nr_3 + 2NH_4HF_2 \rightarrow NH_4AlF_4 + R_3N \cdot HCl + NH_4Cl + HCl$$

Preferably, the reaction can be performed in an anhydrous environment to prevent undesired reactions. The reaction can be performed over a wide range of pressures, e.g. one to ten atmospheres, more conveniently at about ambient pressures A flow of inert gas, e.g. nitrogen, can be used to maintain anhydrous conditions and convenient pressure and to purge by-product gases, e.g. hydrogen chloride.

The reactions can be performed over a wide range of temperatures. Generally, higher reaction temperatures produce higher reaction rates and greater yields. Reaction temperatures preferably range from about room temperature to about the sublimation temperature of the reactants and products. More preferably, the temperature can range from about room temperature to about 300° C.

The aluminum fluoride produced by the reaction of the amine-aluminum trichloride complex and the bifluoride compound is dependent in part upon the particular reactants used. For instance, when ammonium bifluoride is a reactant, the aluminum fluoride product comprises predominantly a compound having the formula $NH_4AlF_4$. $NH_4AlF_4$ can be pyrolyzed to produce aluminum trifluoride ($AlF_3$) and ammonium fluoride ($NH_4F$). Ammonium fluoride can be reacted with hydrogen fluoride (HF) to produce ammonium bifluoride ($NH_4HF_2$), which can be recycled for use with the present invention.

In another instance, when sodium bifluoride is a reactant, the aluminum fluoride product comprises predominantly a compound having the formula $Na_5Al_3F_{14}$, e.g. chiolite. Chiolite, among other uses, is useful in aluminum reduction cell baths and as a binder for grinding wheel abrasives.

Other products can be present, such as the hydrogen chloride complex of the amine (e.g. $Et_3N\cdot HCl$), metal chlorides (e.g. sodium chloride or potassium chloride), and hydrogen chloride gas. These by-products have further uses, such as conversion of the amine·hydrogen chloride complex (e.g. $Et_3N\cdot HCl$) back to the aluminum trichloride·amine complex (e.g. $AlCl_3\cdot NEt_3$).

Another embodiment comprises the step of reacting an amine·aluminum trichloride complex and a bifluoride compound to produce a first reaction mass comprising an aluminum fluoride compound, hydrogen chloride and an amine·hydrogen chloride complex. The first reaction mass can also comprise ammonium chloride or metalchloride. The hydrogen chloride conveniently can be a gas in the processes as described herein. Removal of the hydrogen chloride gas can be effected by purging of the reaction vessel with an inert gas stream, e.g. nitrogen. The amine·hydrogen chloride complex can be extracted from the reaction mass with an alkyl halide, preferably an alkyl chloride, more preferably methylene chloride (e.g. $CH_2Cl_2$). Accordingly, an embodiment of the present invention comprises the immediately above-stated embodiment and further comprises the steps of:
 (a) removing the hydrogen chloride from the reaction mass, and
 (b) extracting the amine·hydrogen chloride complex using an alkyl halide, preferably an alkyl chloride, more preferably methylene chloride.

Another embodiment is the instance wherein the reaction mass further comprises reactants that are ammonium chloride, potassium chloride or sodium chloride In this embodiment the process in addition to the above steps further comprises after extraction with the alkyl halide the step of extracting the ammonium chloride, potassium chloride or sodium chloride with water.

The following examples illustrate embodiments of the invention but are not intended to limit the scope of the invention.

EXPERIMENT 1

PREPARATION OF COMPLEX $AlCl_3\cdot NEt_3$

A mixture of 4.04 grams $AlCl_3$ (Aldrich Reagent, 0.03 mole) and 3.04 grams $Et_3N$ (Aldrich, 0.03 mole) was stirred in 16.2 grams dry toluene until dissolved. Then the solution was heated at 85 to 90 degrees Centigrade on an oil bath while blowing in gaseous $N_2$. The residue consisted of the complex product of $AlCl_3\cdot NEt_3$, being an orange-colored solid at room temperature. Attempts to separate $NEt_3$ from the complex by heating (i.e. 150° C. to 175° C.) under vacuum proved ineffective.

EXPERIMENT 2

Reaction of $AlCl_3\cdot NEt_3$ with $NaHF_2$

A solution of $AlCl_3NEt_3$ was prepared by admixing 2.74 L grams of $AlCl_3$ (97%; 0.020 mol), 2.04 grams of $Et_3N$ (99%; 0.020 mol), and 10.0 grams of toluene. To this solution was added 3.72 grams of $NaHF_2$ (0.060 mol) to form a slurry. The toluene was distilled out using a 50 mL round-bottom flask, distillation head and a 150° C. oil bath. Then a straight tube connected to a $N_2$ bubble was attached to the flask. The oil bath temperature was gradually raised while keeping gaseous $N_2$ flowing over the outlet of the flask. At about 200° C., reaction began to take place as evidenced by HCl being liberated, but was not collected. The slurry was still liquid ($AlCl_3\cdot NEt_3$ m.p. is 113°–114° C.; where the $Et_3N\cdot HCl$ m.p. is 253°–4° C.). At about 250° C. the slurry solidified, but at 255° C. the contents liquidified again at the bottom of the flask and seemed to be bubbling. After 10 minute at 255° C., the run was terminated.

The solid product (light tan in color) was extracted with 3×20 mL portions of $CH_2Cl_2$ to remove $Et_3N\cdot HCl$ and any residual $AlCl_3\cdot NEt_3$. The resulting white powder was then slurried in 20 mL distilled water, stirred 15 minutes at room temperature and filtered. The filter cake was rinsed with 15 mL distilled water and dried overnight at 110° C.

The dry product (a white powder) weighed 3.00 grams. X-ray powder diffraction (XRD) analysis of the solid indicated that chiolite ($Na_3Al_3F_{14}$) was the major component; $AlF_2(OH)$ was a minor component; and cryolite ($Na_3AlF_6$) was a trace component.

Therefore, the actual reaction was $$3AlCl_3\cdot NEt_3 + 7NaHF_2 \rightarrow Na_5Al_3F_{14} + 3Et_3N\cdot Hcl + 2NaCl + 4HCl,$$

producing a chiolite yield of 97% based on $AlCl_3$ charged.

EXPERIMENT 3

Reaction of $AlCl_3\cdot NEt_3$ with $NH_4HF_2$

To a 100 mL round-bottom flask were added 8.0 grams of dry toluene, 2.74 grams of $AlCl_3$ (97%; 0.020 mole), and 2.04 grams of $Et_3N$ (99%; 0.020 mole).

The mixture was stirred until cool, then 3.42 grams of $NH_4HF_2$ (99%; 0.060 mole) were added. The slurry was agitated overnight under $N_2$ at room temperature The next morning reaction clearly had occurred as evidenced by the increase in the volume of solid particles. Toluene was stripped off using a 150° C. oil bath and the solid residue held one hour more in a 160° C. oil bath under $N_2$. When the solids cooled, 20 mL of $CH_2Cl_2$ was added and the mixture stirred for 2 hours. This mixture was allowed to stand overnight under $N_2$. The reaction slurry was filtered and the cake washed with 2×20 portions of fresh $CH_2Cl_2$ and oven dried at 100° C. The cake weighed 5.00 grams. A sample was analyzed by XRD. Analysis determined $NH_4Cl$ as the major component and $NH_4AlF_4$ in minor proportions. The cake then was suspended in 20 mL distilled water, stirred well and filtered The cake was rinsed with 10 mL distilled water, and then dried 2 hours in a 10° C. oven. The dry solids weighed 2.40 grams. A sample was analyzed by XRD and determined to be $NH_4AlF_4$. The reaction produced a $NH_4AlF_4$ yield of 99% based on $AlCl_3$ charged.

I claim:

1. A process comprising the reaction of an amine aluminum trichloride complex and a bifluoride to produce an aluminum fluoride compound.

2. The process in claim 1 wherein the amine·aluminum trichloride complex is represented by the formula $AlCl_3\cdot NR_3$ and each R is independently selected from a group consisting of hydrogen, methyl, ethyl, propyl and butyl.

3. The process in claim 2 wherein propyl is n-propyl and butyl is n-butyl.

4. The method of claim 1 wherein the bifluoride is selected from a group consisting of ammonium bifluoride, potassium bifluoride and sodium bifluoride.

5. The process of claim 1 wherein the aluminum fluoride complex is ammonium aluminum fluoride, potassium aluminum fluoride or sodium aluminum fluoride.

6. The process of claim 5 wherein the aluminum fluoride complex is ammonium aluminum fluoride or sodium aluminum fluoride.

7. The process of claim 1 conducted in toluene solvent.

8. The process of claim 1 comprising the step of:
reacting an amine·aluminum trichloride complex and a bifluoride to produce a first reaction mass comprising an aluminum fluoride compound, hydrogen chloride and an amine·hydrogen chloride complex.

9. The process of claim 8 further comprising the steps of:
(a) removing the hydrogen chloride from the first reaction mass, and
(b) subsequently extracting the amine·hydrogen chloride complex using an alkyl chloride.

10. The process of claim 9 wherein the alkyl chloride is methylene chloride.

11. The process of claim 9 wherein said first reaction mass comprises ammonium chloride, potassium chloride or sodium chloride and further comprising after step (b) a step (c) of extracting said ammonium chloride, potassium chloride or sodium chloride with water.

* * * * *